United States Patent [19]

Kathawala

[11] 3,818,001
[45] June 18, 1974

[54] 1,2,3-BENZOTRIAZIN-4(3H)-ONES
[75] Inventor: Faizulla G. Kathawala, West Orange, N.J.
[73] Assignee: Sandoz-Wander, Inc., Hanover, N.J.
[22] Filed: July 24, 1972
[21] Appl. No.: 274,312

Related U.S. Application Data
[63] Continuation of Ser. No. 124,486, March 15, 1971, abandoned.

[52] U.S. Cl..... 260/247.7 A, 260/240 AS, 424/249, 424/248
[51] Int. Cl............................................. C07d 55/08
[58] Field of Search................ 260/248 AS, 247.7 A

[56] References Cited
UNITED STATES PATENTS
3,163,646  12/1964  Herlinger et al................ 260/248 X
3,316,262  4/1967  Hasspacher et al................ 260/248

Primary Examiner—John M. Ford
Attorney, Agent, or Firm—Gerald D. Sharkin

[57] ABSTRACT

Disclosed are compounds of the class of 1,2,3-benzotriazin-4(3H)-ones which are substituted at the 3- position and which are substituted at at least two of the 6,7 and 8- positions by alkoxy or by an adjacent methylenedioxy, e.g. 6,7-dimethoxy-3-(3-morpholinopropylamino)-1,2,3-benzotriazin-4(3H)-one. The compounds have pharmacological activity in animals, e.g. anti-inflammatory activity. The compounds may be prepared, for example, by alkylation of the corresponding 3-unsubstituted compounds and by reaction of an appropriately disubstituted anthranil amide with sodium nitrite and a strong inorganic acid, e.g. sulfuric acid.

17 Claims, No Drawings

1,2,3-BENZOTRIAZIN-4(3H)-ONES

This application is a continuation of application Ser. No. 124,486, filed Mar. 15, 1971, now abandoned.

This invention relates to chemical compounds which are 1,2,3-benzotriazin-4(3H)-ones having pharmacological activity in animals, e.g. anti-inflammatory activity, and to pharmaceutical compositions and methods based on said pharmacological activity.

The compounds of the present invention may be represented by the structural formula I:

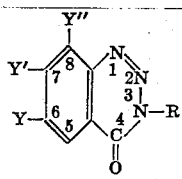

wherein
R is lower alkyl of 1 to 6 carbon atoms,

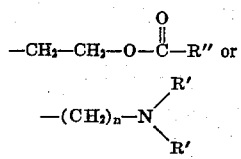

each R' is lower alkyl of 1 to 3 carbon atoms or both R' together with the nitrogen to which they are attached form

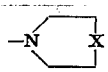

X is oxygen, —(CH$_2$)$_m$— or

m is 0 to 2,
R'' is lower alkyl of 1 to 3 carbon atoms,
n is 0 to 3, provided that both R' are not lower alkyl when n is 0, and
each of Y, Y' and Y'' is hydrogen or lower alkoxy of 1 to 3 carbon atoms provided at least two of Y, Y' and Y'' are lower alkoxy, or two of Y, Y' and Y'' which are adjacent to each other together form methylenedioxy (while the other is hydrogen).

The compounds of the formula I may be prepared by reacting a compound of the formula II:

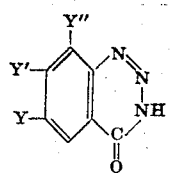

wherein Y, Y' and Y'' are as above defined, with a compound of the formula III:

wherein R is as defined and Z is halo of atomic weight of from 35 to 127 or —OB in which B is methane sulfonyl, benzene sulfonyl or p-toluenesulfonyl, in the presence of a base.

The preparation of compounds I by reacting a compound II with a compound III is suitably carried out at temperatures in the range of from 30°C. to 120°C., typically 40°C. to 80°C., and in the presence of strong base such as sodium hydride, sodium hydroxide and the like. The reaction is conveniently carried out in the presence of an inert organic solvent of conventional type, such as a lower alkanol, e.g. methanol or ethanol, or dimethylacetamide. The reaction product of the formula I may be isolated from the resulting reaction mixture by working up by conventional procedures.

The compounds of the formula I may be also prepared by reacting a compound of the formula IV

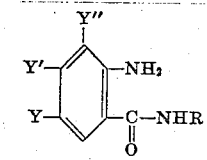

in which R, Y, Y' and Y'' are as above defined, with a diazotisation reagent in the presence of a strong acid.

The preparation of compounds I from compounds IV is suitably carried out at temperatures in the range of from minus 30°C. to plus 20°C., typically minus 10°C. to plus 10°C. The diazotisation reagent is desirably sodium nitrite and the acid employed is most suitably sulfuric acid. The reaction is of known type and the resulting reaction product of the formula I may be isolated from the resulting reaction mixture by working up by established procedures.

The compounds of the formula II are preferably prepared from compound IV in which R is hydrogen by the procedure above-described for the preparation of compounds I from compounds IV. The compounds of the formula IV in which R is hydrogen may themselves be prepared in accordance with the following reaction scheme:

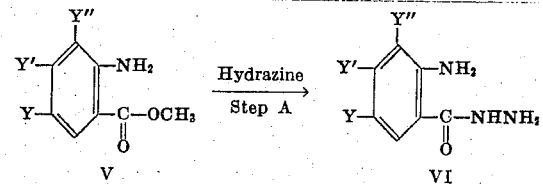

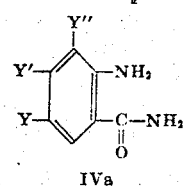

in which Y, Y' and Y'' are as above defined.

The reaction of Step A is of known type and suitably effected at elevated temperatures in the range of 50°C. to 150°C., preferably 80°C. to 130°C. While inert organic solvents of conventional type may be employed it is generally preferred to employ an excess of hydrazine of the solvent for the reaction.

The reaction of Step B is a conventional reduction reaction preferably effected with Raney Nickel in an inert organic solvent. The reaction may be effected at temperatures of from 20°C. to 120°C., preferably 50°C. to 100°C. The solvent employed may be any of several of the inert organic solvents, preferably a lower alkanol such as ethanol or methanol.

The intermediates of the formula IV in general may be prepared according to the following process:

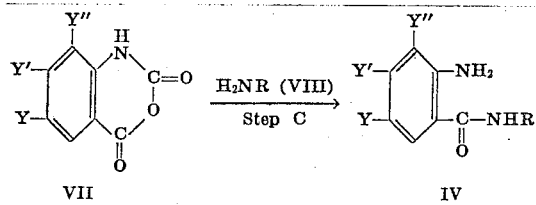

in which R is as above defined.

The process of Step C involving the reaction of a compound VII with an amine of the formula VIII may be effected at temperature in the range of 0°C. to 120°C., preferably 50°C. to 100°C. The reaction is desirably carried out in the presence of an inert organic solvent which may be any of several of conventional type, preferably a lower alkanol such as methanol or ethanol. When producing compounds IV in which R is hydrogen the compound VIII is ammonia and the solvent system desirably includes or consists of water such that aqueous ammonium hydroxide is preferably employed as the source of both ammonia and solvent. In such cases the reaction is generally carried out at temperatures of from 0°C. to 60°C., preferably 10°C. to 25°C.

The compounds of the formula V and the formula VII are either known or may be prepared by procedures well established for preparation of the known compounds.

The compounds of the formula I in which R constitutes a basic side chain, e.g. R is dialkylaminoalkyl, morpholino and the like, form acid addition salts and those compounds of the formula I in the form of non-toxic pharmaceutically acceptable salts are included within the scope of the present invention. Such pharmaceutically acceptable salts include, by way of illustration, the hydrochloride, fumarate, maleate, formate, acetate, sulfonate and malonate. The acid addition salts of the subject compound I may be produced from the corresponding free bases by conventional procedures known in the art. Conversely, the free basis may be produced from the acid addition salts by conventional procedures.

The compounds of formula I are useful because the possess pharmacological activity in animals. In particular, the compounds I are useful as anti-inflammatory agents as indicated by an inhibition of Carrageenan induced edema in rats and a reduction in foot volume and an improvement in grip strength in the adjuvant arthritis test in rats using Mycobacteria butyricum in Freund's adjuvant. For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compound used and the mode of administration. However, in general, satisfactory results are obtained when administered at a daily dosage of from about 2 milligrams to about 200 milligrams per kilogram of body weight, preferably given in divided doses 2 to 4 times a day, or in sustained release form. For most mammals the administration of from about 120 milligrams to about 2000 milligrams of the compound per day provides satisfactory results and dosage forms suitable for internal administration comprise from about 30 milligrams to about 1000 milligrams of the compound in admixture with a solid or liquid pharmaceutical carrier or diluent.

For the above usage, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g. inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet which may be administered four times a day and prepared by conventional tabletting techniques to contain the following ingredients:

| Ingredient | Weight (mg.) |
| --- | --- |
| Compound of the formula I | 100 |
| Tragacanth | 10 |
| Lactose | 147.5 |
| Corn Starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

6,7-Dimethoxy-1,2,3-benzotriazin-4(3H)-one.

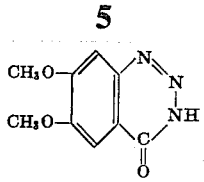

STEP A: Preparation of 4,5-dimethoxy-anthranilic acid hydrazide.

A mixture of 50 g. of 4,5-dimethoxymethylanthranilate and 200 ml. of anhydrous hydrazine is refluxed for 30 minutes, and then poured onto ice-water. The resulting mixture containing a grey-white precipitate is filtered and the recovered precipitate washed first with ice-cold water, then with diethyl ether and then dried overnight under high vaccum at 70°C. to obtain 4,5-dimethoxy-anthranilic acid hydrazide, m.p. 176–177°C.

STEP B: Preparation of 4,5-dimethoxy-anthranilamide.

A mixture of 43 g. of 3,4-dimethoxyanthranilic acid hydrazide, 205 g. of water-suspended Raney Nickel and 600 ml. of absolute ethanol is refluxed under nitrogen until the evolution of ammonia ceased (about 2 hours). The resulting mixture is filtered and the filtrate evaporated in vacuo to dryness. The residue is dissolved in methylene chloride, the solution dried over sodium sulfate and ethanol added to crystallize a material which is washed with diethyl ether to obtain 4,5-dimethoxyanthranilamide, m.p. 138–140°C.

STEP C: Preparation of 6,7-dimethoxy-1,2,3-benzotriazin-4(3H)-one.

To a suspension of prepared by heating together 4.0 g. of 4,5-dimethoxy-anthranilamide in 60 ml. of n-propanol and 20 ml. of 3N sulfuric acid and then cooling to 0–5°C. is added dropwise over one-half hour 1.5 g. of sodium nitrite in 7.0 ml. of water. The resulting mixture is kept at 0–5°C. for 3 hours and then allowed to stand overnight at room temperature. The mixture is then diluted with water while stirred vigorously and then filtered to recover the precipitate solids which are washed with water, redissolved in 1.5 liters of boiling chloroform/ethanol (1:1) which is filtered while hot. The filtrate is concentrated in vacuo to obtain 6,7-dimethoxy-1,2,3-benzotriazin-4(3H)-one, m.p. 273–274°C.

EXAMPLE 2

3-(β-N-homopiperidino)ethyl-6,7-dimethoxy-1,2,3-benzotriazin-4(3H)-one.

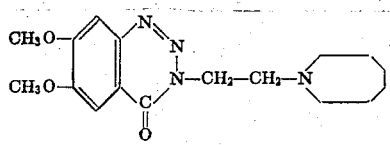

To a suspension of 8.3 g. of 6,7-dimethoxy-1,2,3-benzotriazin-4(3H)-one in dimethylacetamide at room temperature is added 4.04 g. of 57% suspension of sodium hydride in mineral oil over a period of about 30 minutes. To the resulting mixture is added 9.5 g. of 2-(hexamethyleneimino)ethyl chloride hydrochloride. The resulting mixture is stirred at room temperature 4 hours, to ice-water and filtered to recover the precipitated material which is crystallized from ethanol to obtain 3-(β-N-homopiperidino)ethyl-6,7-dimethoxy-1,2,3-benzotriazin-4(3H)-one, m.p. 144–145°C.

EXAMPLE 3

Following the procedure of Example 1, the following compound is prepared:
a. 6,7-methylenedioxy-1,2,3-benzotriazin-4(3H)-one, m.p. 250–251°C.

EXAMPLE 4

Following the procedure of Examples 1 and 2, the following compounds of the invention are prepared:
a. 3-β-dimethylaminoethyl-6,7-dimethoxy-1,2,3-benzotriazin-4(3H)-one, m.p. 165–167°C.
b. 3-methyl-6,7-dimethoxy-1,2,3-benzotriazin-4(3H)-one, m.p. 261–262°C.
c. 3-isopropyl-6,7-dimethoxy-1,2,3-benzotriazin-4(3H)-one, m.p. 250–251°C.
d. 3-ethyl-6,7-dimethoxy-1,2,3-benzotriazin-4(3H)-one, m.p. 217–218°C.
e. 3-isopropyl-6,7,8-trimethoxy-1,2,3-benzotriazin-4(3H)-one, m.p. 100–102°C. (crystallized from diethyl ether).
f. 3-β-dimethylaminoethyl-6,7,8-trimethoxy-1,2,3-benzotriazin-4(3H)-one, m.p. 90–92°C. (crystallized from diethyl ether).
g. 3-(2-hydroxyethyl)-6,7-dimethoxy-1,2,3-benzotriazin-4(3H)-one acetate, m.p. 175–177°C. (crystallized from ethyl acetate).

EXAMPLE 5

3-(3-morpholinopropyl)-6,7-dimethoxy-1,2,3-benzotriazin-4(3H)-one

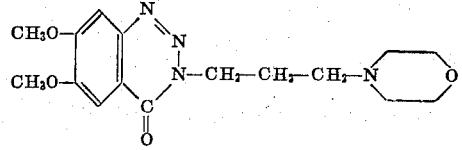

STEP A: Preparation of N-(3-morpholinopropyl)-4,5-dimethoxyanthranilamide.

A suspension of 11.2 g. of 6,7-dimethoxyisatoic anhydride and 8.9 g. of N-(3-aminopropyl)-morpholine in 250 ml. of 95% ethanol is refluxed for 15 minutes and the resulting solution cooled and evaporated in vacuo. The resulting oil is dissolved in methylene chloride and treated first with a 10% aqueous sodium bicarbonate solution and then with water. The resulting solution is dried and evaporated in vacuo to obtain an oil of N-(3-morpholinopropyl)-4,5-dimethoxyanthranilamide.

STEP B: Preparation of 3-(3-morpholinopropyl)-6,7-dimethoxy-1,2,3-benzotriazin-4(3H)-one.

To a suspension of 15.1 g. of N-(3-morpholinopropyl)-4,5-dimethoxyanthranilamide in 140 ml. of n-propanol and 47 ml. of 3N. sulfuric acid at 0–5°C. is added 3.9 g. of sodium nitrite in 22 ml. of water. The resulting mixture is stirred at ice-bath temperature for a few hours (about 6 hours) and then at room temperature for 24 hours. The resulting mixture is treated with 2N sodium hydroxide solution and diluted with ice water and then with methanol. The resulting mixture is extracted with methylene chloride, the extract dried over sodium sulfate and treated with ethanol to crystallize 3-(3-morpholinopropyl)-6,7-dimethoxy-1,2,3,-benzotriazin-4(3H)-one, m.p. 161–163°C.

EXAMPLE 6

Following the procedure of Example 5 there is prepared:
a. 3-morpholino-6,7-dimethoxy-1,2,3-benzotriazin-4(3H)-one, m.p. 230–231°C.

What is claimed is:
1. A compound of the formula:

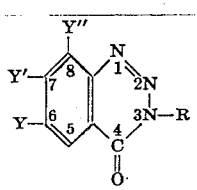

wherein
R is lower alkyl,

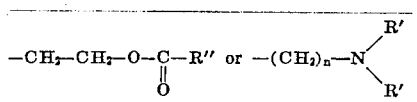

each R' is lower alkyl or both R' together with the nitrogen to which they are attached form

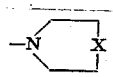

X is oxygen, —(CH₂)ₘ— or

m is 0 to 2,
R'' is lower alkyl,
n is 0 to 3, provided that both R' are not lower alkyl when n is 0, and
each of Y, Y' and Y'' is hydrogen or lower alkoxy provided at least two of Y, Y' and Y'' are lower alkoxy, or two of Y, Y' and Y'' which are adjacent to each other together form methylenedioxy;
or a pharmaceutically acceptable non-toxic acid addition salt thereof.

2. A compound of claim 1 in which R is lower alkyl.
3. A compound of claim 2 in which Y and Y' are methoxy and Y'' is hydrogen.
4. The compound of claim 3 in which R is methyl.
5. The compound of claim 3 in which R is isopropyl.
6. The compound of claim 3 in which R is ethyl.
7. The compound of claim 2 in which R is isopropyl and each Y, Y' and Y'' is methoxy.
8. A compound of claim 1 in which R is β-dimethylaminoethyl.
9. The compound of claim 8 in which Y and Y' are methoxy and Y'' is hydrogen.
10. The compound of claim 8 in which each of Y, Y' and Y'' is methoxy.
11. A compound of claim 1 in which R is —(CH₂—)ₙ—NR'R''.
12. A compound of claim 11 in which R is β-(N-homopiperidino) ethyl.
13. The compound of claim 12 in which Y and Y' are methoxy and Y'' is hydrogen.
14. A compound of claim 11 in which R is 3-morpholinopropyl.
15. The compound of claim 14 in which Y and Y' are methoxy and Y'' is hydrogen.
16. A compound of claim 1 in which R is

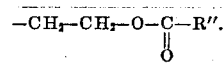

17. The compound of claim 16 in which R'' is methyl, Y and Y' are methoxy and Y'' is hydrogen.

* * * * *